April 22, 1958 G. ADLER ET AL 2,831,342
APPARATUS FOR MEASURING STRESS RELAXATION
Filed June 28, 1956 4 Sheets-Sheet 1
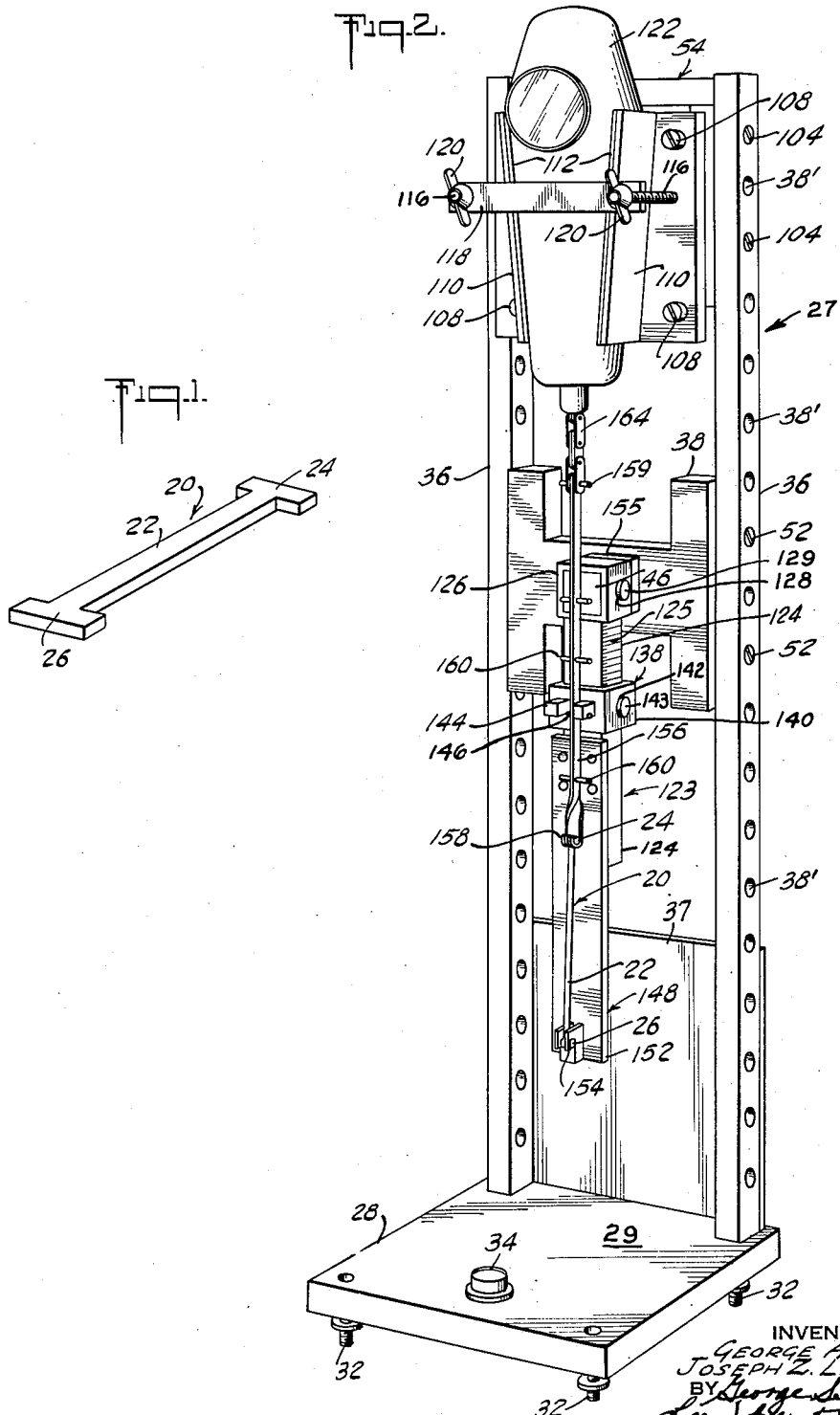
INVENTORS
GEORGE ADLER
JOSEPH Z. LICHTMAN
BY
ATTORNEYS

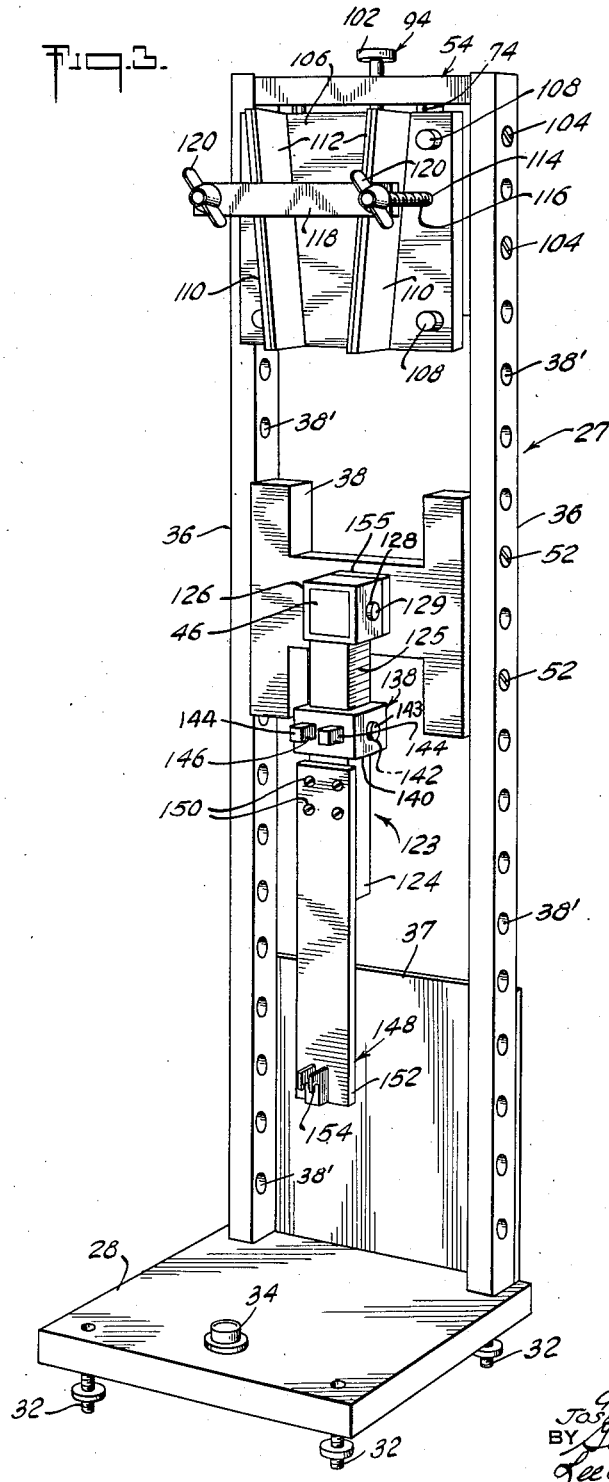

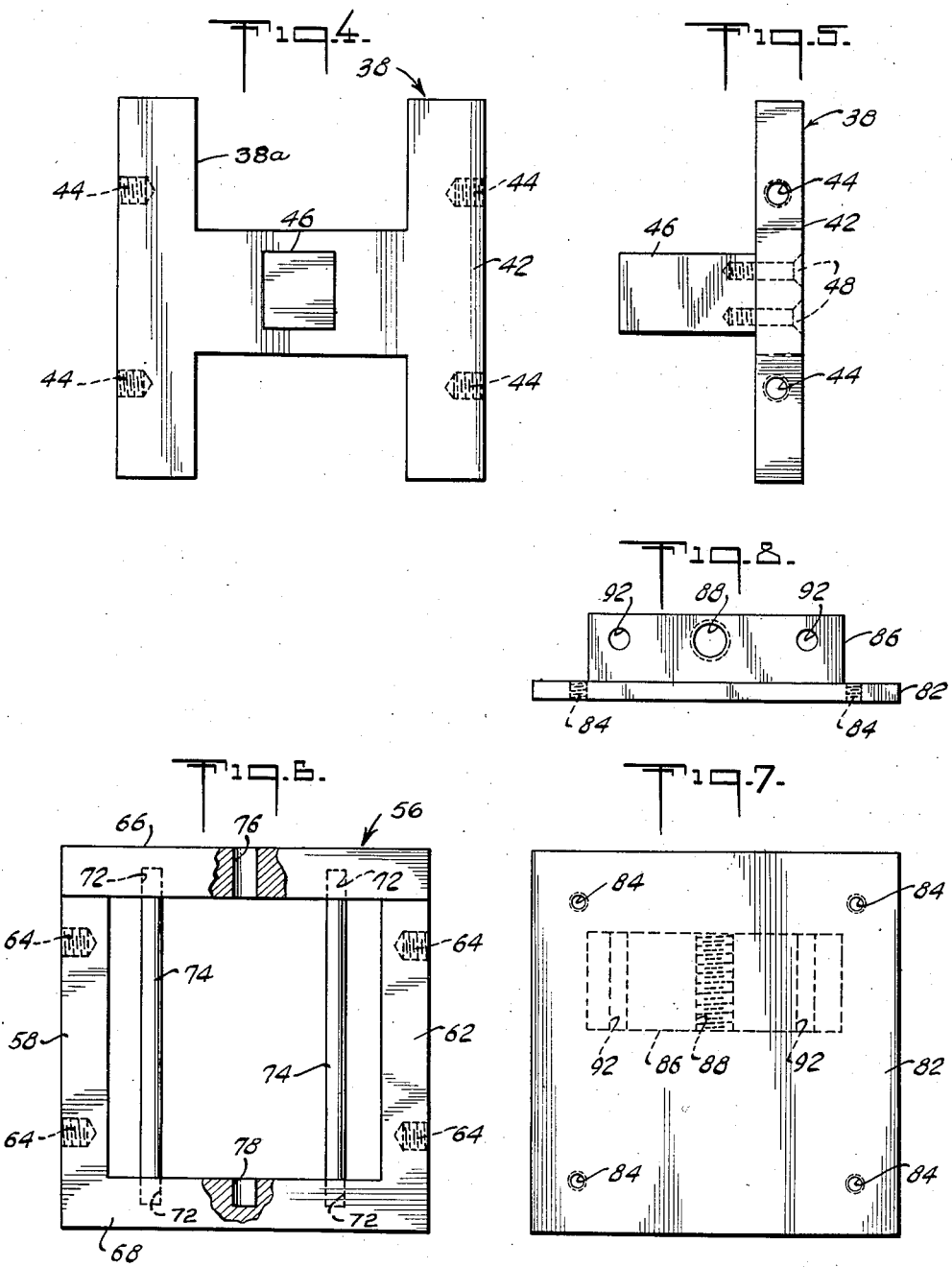

April 22, 1958 G. ADLER ET AL 2,831,342
APPARATUS FOR MEASURING STRESS RELAXATION
Filed June 28, 1956 4 Sheets-Sheet 4
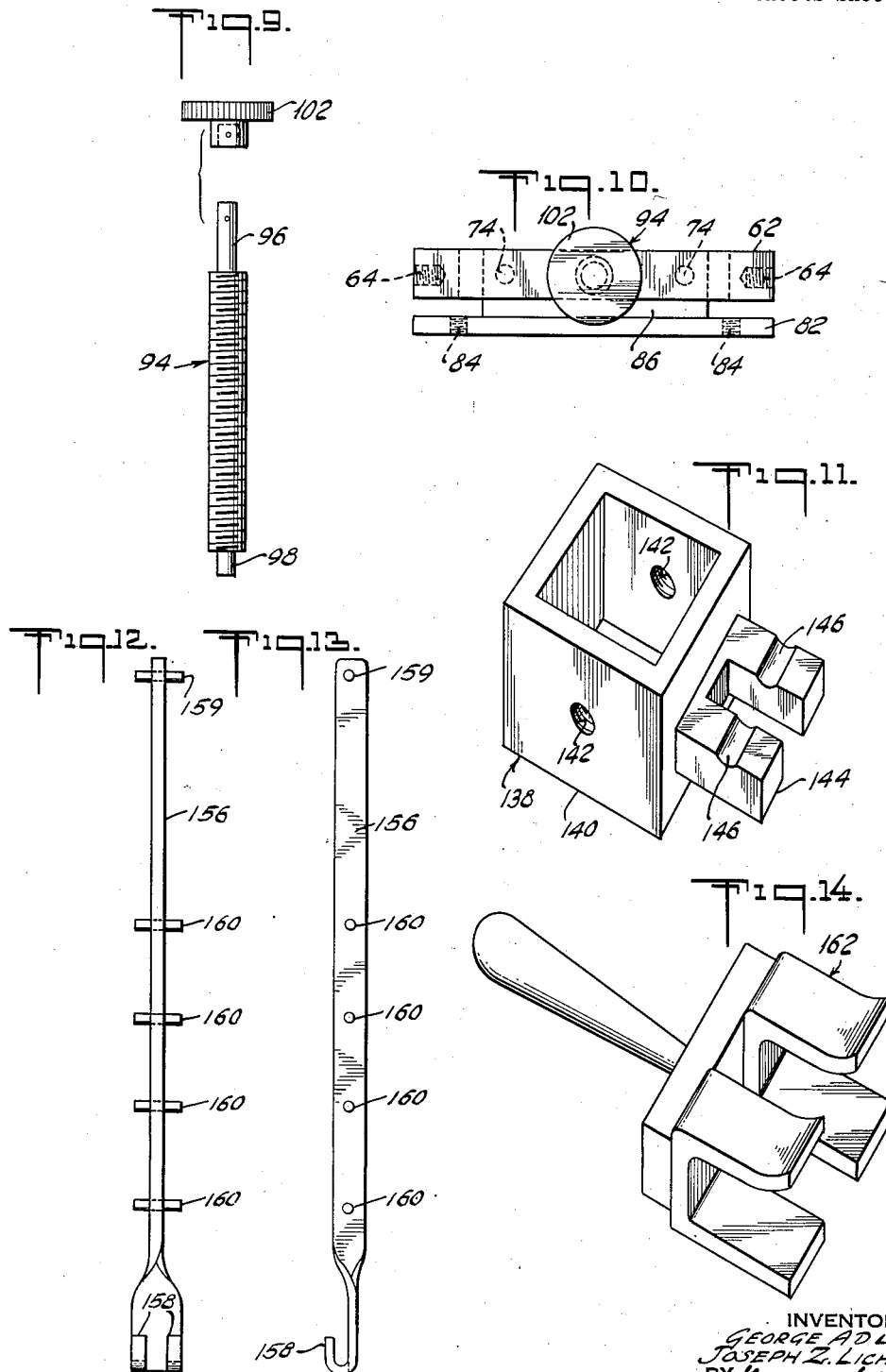
INVENTORS
GEORGE ADLER
JOSEPH Z. LICHTMAN
BY
ATTORNEYS United States Patent Office 2,831,342
Patented Apr. 22, 1958

2,831,342

APPARATUS FOR MEASURING STRESS RELAXATION

George Adler and Joseph Z. Lichtman, New York, N. Y.

Application June 28, 1956, Serial No. 594,668

4 Claims. (Cl. 73—95)

(Granted under Title 35, U. S. Code (1952), sec. 266)

The invention described herein may be manufactured and used by or for the Government of the United States of America for governmental purposes without the payment of any royalties thereon or therefor.

This invention concerns an apparatus for measuring stress relaxation and more particularly an apparatus for measuring stress relaxation for use in ascertaining the stress decay characteristics of natural and synthetic elastomers under various ambient conditions and at various percent strains.

There are a multiplicity of products made from elastomers that are designed for use under constant stress conditions and there are a multiplicity of products made from elastomers that are designed for use under constant strain conditions. An example of a type of product made from elastomers and designed for use under constant stress conditions are shock absorbers which are used to support machinery, sensitive instruments, and various other types of apparatus on bases and perform the function of shock and vibration isolating means. Example of types of elastomer products that are designed for use under constant strain conditions are gaskets used in couplings for fluid conduits, washers under the heads of bolts, and gaskets on doors and door frames. The properties of elastomers, particularly the elastic properties, change with age and also change as a function of ambient conditions. Where the elastomer is subjected to a constant strain the change in elastic properties is described as stress decay or stress relaxation. Where the elastomer is subjected to a constant stress the change in elastic properties is described as creep. This invention is concerned with ascertaining stress decay in elastomers subjected to a constant strain.

An object of this invention is to provide an apparatus for measuring stress relaxation.

A further object is to provide a stress relaxation apparatus for ascertaining the stress decay characteristics of natural and synthetic elastomers.

A further object is to provide a tensile stress relaxation apparatus for ascertaining the stress decay characteristics in an elastomer specimen of known cross section and length by subjecting the elastomer specimen to a constant strain, affording an arrangement for easy and quick measurement of the restoring force in the specimen, and permitting the specimen to be subjected to any of various ambient conditions conveniently.

Other objects and many of the attendant advantages of this invention will be readily appreciated as the same becomes better understood by reference to the following detailed description when considered in connection with the accompanying drawings wherein:

Fig. 1 is a view in perspective of an elastomer specimen to be tested by this invention;

Fig. 2 is a view in perspective of an embodiment of this invention assembled with a specimen in place;

Fig. 3 is a perspective view of the invention with some parts removed;

Figs. 4 and 5 are front and side views of the test jig support drawn to a larger scale than Figs. 2 and 3 and differing somewhat from the corresponding part in Figs. 2 and 3;

Fig. 6 is a front view of the carrier frame of the gage support assembly drawn to substantially the same scale as Figs. 4 and 5;

Figs. 7 and 8 are front and top views, respectively, of the carrier plate of the gage support assembly drawn to substantially the same scale as Figs. 4–6;

Fig. 9 is an exploded view of the adjusting screw of the gage support assembly drawn to substantially the same scale as Figs. 4–8;

Fig. 10 is a top view of a subassembly of the parts shown in Figs. 6–9 drawn to substantially the same scale as Figs. 4–9;

Fig. 11 is a perspective view of the upper specimen grip drawn to a larger scale than the corresponding part in Figs. 2 and 3;

Figs. 12 and 13 are front and side views of the movable rod of the test jig assembly drawn to a larger scale than the corresponding part in Figs 2 and 3; and Fig. 14 is a perspective view of the clip of the test jig assembly drawn to a larger scale than Figs. 2 and 3.

In Fig. 1 there is shown the elastomer specimen 20 adapted for stress relaxation tests by this invention. The specimen includes a central elongated portion 22 of known cross sectional area and of known length. The ends 24 and 26 are widened. The specimen shape is obtained by molding.

The embodiment of this invention illustrated in the drawings includes a supporting stand 27 having a flat base 28 (Fig. 3). The base 28 is supported by four adjustable legs 32. A spirit level 34 is secured to the upper surface 29 of the base 28 to guide the leveling of surface 29. A pair of identical rigid uprights 36 are fixedly secured to the base 28 normal to the surface 29 thereof. The rigidity of the uprights 36 is reinforced by a plate 37 affixed to the uprights and to the base. Each of the uprights is formed with equally spaced bores 38' at like distances from base surface 29.

A test jig support 38 is mounted on the uprights 36. The test jig support comprises a flat plate 42 (Figs. 4 and 5). Opposed sections 38a of the plate 42 are removed to eliminate unnecessary weight. A pair of opposite sides of the flat plate 42 are formed with identical tapped holes 44. The spacing between the tapped holes 44 correspond to the spacing between the bores 38' in the uprights. A rectangular stud 46 is secured endwise to the center of the flat plate 42 by means of screws 48. The test jig support 38 is secured in a selected position on the uprights 36 by means of machine screws 52 (Figs. 2 and 3) or other type screws such as thumb screws, in registration with selected bores 38' of the uprights and engaging the tapped holes 44 in the flat plate 42.

A gage support 54 is mounted between the top portions of the uprights 36. The gage support 54 includes a rectangular carrier frame 56 (Fig. 6). A pair of opposite sides 58 and 62 of the carrier frame are formed with identical tapped holes 64. The spacing between the pairs of tapped holes 64 corresponds to the spacing between the bores 38' in the uprights 36. The other two sides 66 and 68 of the carrier frame are formed with two pairs of aligned recesses 72. A pair of smooth guide pins 74 are seated in the recesses 72. The side 66 of the carrier frame is formed with a bore 76. The side 68 of the carrier frame is formed with a recess 78 in axial alignment with the bore 76.

A carrier plate 82 (Figs. 7 and 8) is adapted to be assembled with the carrier frame. The plate 82 is formed with four tapped bores 84. A rectangular metal block 86 is secured to the plate 82. The metal block 86 is formed with a central tapped bore 88 and bores 92 to each side thereof. The carrier plate 82 is assembled on the carrier frame 62 with the bores 92 in the rectangular block 86 in sliding registration with the pins 74.

An adjusting screw 94 (Fig. 9) having reduced end portions 96, 98 and a ridged finger grip 102 for rotating the screw is provided for adjustably positioning, up and down, the carrier plate on the carrier frame. Upon assembly, the reduced end 98 of the adjusting screw 94 is seated for rotation in the recess 78. The screw threads engage the threaded bore 88. The reduced end 96 between the threads and the finger grip 102 is rotatable in the bore 76 in the top side 66 of the carrier frame. A top view of the subassembly of carrier frame 56, carrier plate 82, and adjusting screw 94 is shown in Fig. 10. The subassembly of Fig. 10 is mounted between the uprights 36 adjacent the upper ends thereof by means of machine screws 104 (Figs. 2 and 3) or other type screws such as thumb screws in registration with selected bores 38' of the uprights and in threaded engagement with the tapped holes 64 in the frame.

A gage support plate 106 (Fig. 3) seats against the carrier plate 82; the gage support plate is formed with four bores 108 for registration with the threaded bores 84 in the carrier plate 82. A pair of metallic gage support members 110 are secured to the face of gage support plate 106 by any convenient means such as brazing, screws, pins or other; the gage support members are disposed in convergent relationship. A rubber pad 112 is cemented to each of the facing surfaces of the gage support members 110. The gage support plate 106 is formed with a bore 114 adjacent the outer side of each gage support member 110. The bores 114 are countersunk on the rear side of gage support plate 106. A pair of flat head bolts 116 are seated in the bores 114 and are fixed therein by brazing. A retaining strap 118 formed with either bores or slots is slidably engaged with the bolts 116. Wing nuts 120 threadedly engage the bolts 116. A force gage 122 (Fig. 2) seats against the rubber pads 112 and the gage support plate 106; the force gage is secured by the retaining strap 118 and the wing nuts 120.

A removable test jig 123 is mounted on the test jig support 38. The test jig 123 includes a jig column 124 having calibration markings 125. A rectangular sleeve 126, having inside dimensions for a sliding fit over the rectangular stud 46, is secured to one end of the jig column 124 by any suitable means. One side of the rectangular sleeve 126 is formed with threaded bores 128 for fastening screws 129 (Fig. 2). An upper specimen grip 138 is disposed intermediate the ends of the jig column 124. The upper specimen grip 138 (Fig. 11) includes an adjustable collar 140 slidably engaged with the jig column 124. Opposite sides of the adjustable collar 140 are formed with threaded bores 142. Machine screws 143 (Figs. 2 and 3) or thumb screws engage the threaded bores 142 for securing the adjustable collar 140 in a selected position along the jig column 124. A pair of spaced parallel fingers 144 are secured to one side of collar 140 by any suitable means and are formed with aligned cradling grooves 146. The sleeve 140 is assembled on the jig column 124 with the grooves 146 directed toward end of the jig column remote from sleeve 126. A lower specimen grip 148 (Fig. 3) is secured by means of screws 150 to the end of the jig column remote from sleeve 126. The lower specimen grip includes a flat member 152 to one end of which is secured, by any suitable means, a pair of parallel hooks 154 spaced a predetermined distance apart. The shape of the hooks 154 and their spacing are designed for engagement with one end of a test specimen (Fig. 1). The test jig 123 is mounted on the stud 46 of the test jig support 38. A spacer 155 on the stud 46 ensures proper positioning of the test jig relative to the force gage.

A movable rod 156 (Figs. 12 and 13) formed with a double hook 158 at one end of substantially the same dimensions as the hook 154 is provided for gripping the other end of the specimen. The rod 156 is provided with a transverse pin 159 at one end and a plurality of spaced transverse pins 160. The pins 160 are accurately spaced relative to one another and relative to the bottom of the inside of the hook 158. The other end of the specimen (Fig. 1) is adapted to be gripped by the hook 158. A selected one of the transverse pins 160 is adapted to nest in the cradle grooves 146 of the upper specimen grip 138 when the apparatus is in use.

A clip 162 (Fig. 14) is provided for retaining a selected pin 160 in engagement with the groove 146 as further explained below.

A link chain 164 (Fig. 2) connects the uppermost pin 159 of movable rod 156 to the force gage 122. A flexible connection, as is provided by chain 164, has proven to be more satisfactory than direct connection because it permits self-alignment.

In operation, the adjustable collar 138 is positioned until the cradling grooves 146 therein are a predetermined distance from the hook 154. The selected distance is ascertained by calibration markings 125. One end 26 of a specimen 20 (Fig. 1) of known length between its ends 24, 26 is inserted into the hook 154. The other end 24 of the specimen is inserted into the hook 158 at the end of the movable rod 156. The transverse pin 159 at the opposite end of the movable rod 156 is connected by means of chain 164 to the force transmitting member of force gage 122. If there is too much slack or strain in the specimen prior to adjustment, either the gage support 54 or the test jig support 38 is repositioned on the uprights 36. The pins 160 are known distances apart and known distances from the inside bottom of the hook 158. It is to be noted that when a pin 160 is seated in the grooves 146 with the specimen 20 under tension, the elongation of the specimen is equal to the distance between grooves 146 and hook 154, minus the distance between the pin 160 nested in grooves 146 and the hook 158, minus the normal length of specimen 20 between ends 24 and 26. Therefore starting with the specimen 20 in place and under little or no tension, the screw 94 is turned to apply tensile force to the specimen. Tensile strength is increased until a selected pin 160 on movable rod 156 is brought into nesting engagement with the cradling grooves 146 in the upper specimen grip 138 to provide the selected elongation of the specimen. Screw 94 is turned so that force gage 122 is moved upwardly. If the force gage 122 is zeroed before tension is applied, the tensile force applied to the specimen is read on the gage up to the point where a selected one of the pins 160 nests in the cradling groove 146 of the upper specimen grip 138. Before the selected pin 160 nests in the cradling grooves 146, upward movement of the force gage 122 by means of the screw 94 is taken up for the most part by elongation of the specimen and is taken for the remaining part by strain in the spring of the force gage. After the selected pin 160 nests in the cradling grooves 146 the specimen does not elongate any further regardless of further movement of the force gage upwardly as a result of rotation of the screw 94. Further rotation of screw 94 and consequent motion of the carrier plate 82 and gage 122 is fully taken up by strain in the spring of the force gage. Since the indicator pointer of the force gage is displaced in direct proportion to the strain in the spring of the force gage, the indicator pointer moves much more slowly before the selected pin 160 nests in the cradling groove than after the selected pin 160 nests in the cradling grooves though rotation of screw 94 be substantially steady. Due to the dramatic change in the rate of movement of the indicator pointer at the point corresponding to nesting of the selected pin 160 in the cradling groove, it is a simple matter to elongate the specimen by the predetermined amount and to ascertain the force and thus the stress for producing that much strain in the specimen. The specimen is left on the instrument for a predetermined period of time and under predetermined ambient conditions. To ensure that the specimen strain remains constant over a period of time, the clip 162 is used to keep the selected pin 160 in nesting engagement with the cradling grooves 146. The stress measuring procedure outlined above is repeated at desired intervals. A plot of stress vs. time gives a graphic picture of the stress decay for particular ambient conditions.

Some types of ambient conditions cannot be applied conveniently while the specimen is mounted on the instrument. For example, it may be necessary to place the specimen in a particular bath at a particular temperature. This can be accomplished for short periods of time by simply placing a jar of the bath fluid on the base of the instrument so that the specimen is immersed in it. Though this may be practical for short periods of immersion, it is impractical for long periods because of the difficulty of controlling the temperature of a small quantity of fluid. For extensive periods of immersion, the jig is detached from the gage 122 and removed from the supporting stand 27 and placed in a tank of the immersion fluid or if desired in a conditioning chamber. The jig is remounted on the supporting stand 27 and reattached to the force gage for measurements at predetermined intervals.

Because the jig is removable, one supporting stand and gage assembly can perform measurements on specimens on a considerable number of test jigs.

Alternatively, the test jig can be calibrated so that the cradling grooves 146 in the upper specimen grip 138 face in the opposite direction, namely, upwardly. The measurements can be taken in substantially the same manner described above. This arrangement can also be used for obtaining stress relaxation data where a test specimen of suitable cross section is subjected to compressive stress.

Obviously many modifications and variations of the present invention are possible in the light of the above teachings. It is therefore to be understood that within the scope of the appended claims the invention may be practiced otherwise than as specifically described.

We claim:

1. A tensile stress relaxation apparatus comprising; a supporting stand; a carrier frame mounted on said supporting stand; an adjusting screw rotatably mounted in said carrier frame; guide means mounted on said carrier frame; a carrier means threadedly engaging said adjusting screw and slidably engaging said guide means; whereby rotation of said screw causes rectilinear translation of said carrier means along said guide means; a force gage having a body portion secured to said carrier means and a portion extending from said body portion whereby force to be measured is applied between said body portion and the portion extending from said body portion; a specimen jig including elongated rigid means, a hook secured to one end of said elongated rigid means for gripping one end of a specimen, means having fingers formed with cradling grooves, said elongated rigid means having calibration indicia along a portion of the length thereof, said means having fingers being adapted to be affixed along the calibrated portion of said elongated rigid means whereby the distance between the cradling grooves in said fingers and said hook is ascertained from the calibration indicia, an elongated rod formed with a hook at one end for gripping the other end of a specimen and attachable at its other end to said portion extending from said body portion of said force gage and having at least one pin affixed transversely thereof intermediate the ends thereof whereby when said pin seats in the cradling grooves there is a predetermined spacing between the hook at the end of the rod and the hook at the end of the elongated rigid means, a removable clip for retaining said pin seated in the cradling grooves for ensuring constant elongation of a specimen over a period of time; means secured to said stand and including a locating stud; said specimen jig including a sleeve affixed to said elongated rigid means and engageable with said stud for removably mounting said jig on said stand.

2. An apparatus for measuring stress relaxation in a test specimen comprising: a supporting stand; a force gage having a body portion and a portion extending from said body portion for indicating force applied between said portions thereof; force gage support means adjustably mounting said force gage body portion on said stand near one end thereof with the extending portion of said gage extending toward the other end of said stand whereby said body portion of said force gage is adjustable toward and away from the other end of said stand; a force transmitting element joined at one end to the extending portion of said force gage and extending toward the other end of said stand and having engaging means at its opposite end for securely engaging one end of a test specimen; said force transmitting element having a transverse pin-like member secured thereto at a predetermined distance from the specimen engaging means thereof; a test jig having engaging means at one end for securely engaging the other end of a test specimen, said test jig having a transverse element providing a seat for said transverse pin-like member at a predetermined distance from the specimen engaging means at the one end thereof; a test jig support mounting said test jig on said stand whereby the extending portion of said force gage and the specimen engaging means of said test jig and the seat for said transverse pin-like member are substantially in line; whereby when a test specimen of known length is engaged at its opposite ends by the specimen engaging means of said force transmitting element and of said test jig respectively and said force gage support means is adjusted so that the specimen length is changed until said transverse pin-like element engages the seat therefor, the specimen strain remaining substantially constant thereafter, the stress in said test specimen under the constant strain conditions being ascertainable at selected time intervals from readings of said force gage as said transverse pin-like element is just barely unseated by adjustment of said force gage body portion toward said test jig.

3. An apparatus for measuring stress relaxation as defined in claim 2 further comprising a clip-like fastening for retaining said transverse pin-like element in seated engagement with the seat element of said test jig in the intervals between readings of said force gage.

4. An apparatus for measuring stress relaxation in a test specimen comprising: a supporting stand; a force gage having a body portion and a portion extending from said body portion for indicating force applied between said portions thereof; force gage support means mounting said force gage body portion on said stand near one end thereof with the extending portion of said gage extending toward the other end of said stand; a force transmitting element joined at one end to the extending portion of said force gage and extending toward the other end of said stand and having engaging means at its opposite end for securely engaging one end of a test specimen; said force transmitting element having a transverse member secured thereto at a predetermined distance from the specimen engaging means thereof; a test jig having engaging means at one end for securely engaging the other end of a test specimen, said test jig having a transverse element providing a seat for said transverse member at a predetermined distance from the specimen engaging means at the one end thereof; a test jig support mounting said test jig on said stand whereby the extending portion of said force gage and the specimen engaging means of said test jig and the seat for said transverse member are substantially in line; one of said supports having adjustment means for varying the distance between the body portion of said force gage and said test jig; whereby when a test specimen of known length is engaged at its opposite ends by the specimen engaging means of said force transmitting and of said test jig respectively, and the distance between said force gage and said test jig is adjusted so that the specimen length is changed until said transverse member engages the seat therefor, the specimen strain remaining constant for as long as said transverse member engages the seat therefor, the stress in said test specimen under the constant strain being ascertainable at selected time intervals from readings of said force gage as said transverse member is just barely unseated by adjustment of the distance between the body portion of said force gage and said test jig.

References Cited in the file of this patent

UNITED STATES PATENTS

| | | |
|---|---|---|
| 169,376 | Scott | Nov. 2, 1875 |
| 2,400,920 | Cummings | May 28, 1946 |

FOREIGN PATENTS

| | | |
|---|---|---|
| 342,382 | Great Britain | Feb. 5, 1931 |

OTHER REFERENCES

Publication of John Chatillon & Sons, "Portable Tension Tester," photo No. 948, dated July 16, 1954.